United States Patent  (10) Patent No.: US 8,244,618 B1
Fashenpour et al.  (45) Date of Patent: Aug. 14, 2012

(54) LOAN INFORMATION ANALYSIS SYSTEM AND METHOD

(75) Inventors: Douglas Fashenpour, Austin, TX (US); Sean Dobson, Austin, TX (US)

(73) Assignee: Amherst Holdings, LLC, Austin, TX (US)

( * ) Notice: Subject to any disclaimer, the term of this patent is extended or adjusted under 35 U.S.C. 154(b) by 273 days.

(21) Appl. No.: 12/684,535

(22) Filed: Jan. 8, 2010

Related U.S. Application Data

(60) Provisional application No. 61/143,290, filed on Jan. 8, 2009.

(51) Int. Cl.
*G06Q 40/00* (2006.01)

(52) U.S. Cl. .................................. 705/36 R; 705/38

(58) Field of Classification Search .............. 705/36 R, 705/38
See application file for complete search history.

(56) References Cited

U.S. PATENT DOCUMENTS

| | | | |
|---|---|---|---|
| 6,385,594 B1* | 5/2002 | Lebda et al. | 705/38 |
| 7,882,025 B1* | 2/2011 | Seal et al. | 705/38 |
| 2003/0105696 A1* | 6/2003 | Kalotay et al. | 705/35 |
| 2004/0205019 A1* | 10/2004 | Painter et al. | 705/38 |
| 2008/0109347 A1* | 5/2008 | Pilcher et al. | 705/38 |

* cited by examiner

*Primary Examiner* — Lindsay M. Maguire
(74) *Attorney, Agent, or Firm* — Johnson, Marcou & Isaacs, LLC; George T. Marcou; John M. Harrington

(57) ABSTRACT

Computer-implemented methods and systems for evaluating residential mortgage loan backed security products in which electronic loan data for the same individual loans is received from two or more different loan information providers, and the electronic loan data for respective individual loans received from the loan information providers is integrated. Thereafter, each individual loan in the integrated loan data is scored with a risk score based on a plurality of risk attributes of each individual loan; pre-defined forecast vectors are applied to the bucketed loans; cash flow forecasts are generated for the bucketed loans; and a price and/or yield for each bucketed loan is derived based on the cash flow forecasts.

20 Claims, 12 Drawing Sheets

| | |
|---|---|
| SERIES_NO | CWMBS03-37-1 |
| POOL_ID | TXO |
| DEAL_NO | CW337 |
| GROUP_NO | CWF |
| LOAN_ID | aDFdDq |
| EXLOAN_ID | CWFTXO25748335 |
| LOAN_NO | 25748335 |
| ADD_DATE | 174 |
| PROP_ZIP | 90402 |
| STATE | CA |
| PROP_TYPE | 1 |
| UNITS_NO | 1 |
| OCCUPANCY | 1 |
| ORIG_DATE | 20030611 |
| MATURITY | 20330701 |
| FIRST_PMT | 20030801 |
| ORIG_AMT | 808,000.00 |
| CLOSE_BAL | 808,000.00 |
| CLOSE_INT | 4.50 |
| SALE_PRICE | 1,010,000.00 |
| APP_VALUE | 1,050,000.00 |
| PROD_TYPE | 20 |
| TERM | 360 |

FIG. 2

| POOL_ID | TXO |
|---|---|
| DEAL_NO | CW337 |
| GROUP_NO | CWF |
| SERVICER | NULL |
| LOAN_ID | aDFdDq |
| EXLOAN_ID | CWFTXO25748335 |
| LAST_INT_P | 20080701 |
| BALANCE | 745,520.07 |
| INT_RATE | 5.625 |
| TOTPMT_DUE | 0 |
| SCH_PRINC | 1,141.09 |
| SCH_MNTH_P | 4,641.06 |
| MBA_STAT | C |
| OTS_STAT | C |
| DELIQ_HIST | 6FFFFC3C333C |
| EXCEPTION | NULL |
| FC_START_D | 20070901 |
| FC_END_D | 20080101 |

| 500 | 502 | 504 |
|---|---|---|
| Voluntary (Prepays) | Involuntary (Defaults) | In-the-Pipeline (90+, FCL, REO) |
| Fixed | Fixed | All loan types |
| 2/28 ARM | 2/28 ARM | |
| 3/27 ARM | 3/27 ARM | |
| 5/25 ARM | 5/25 ARM | |
| Etc | Etc | |

FIG. 5

| Green | | Yellow | | Red | |
|---|---|---|---|---|---|
| FICO 660 - 1100 CLTV 0 - 100 | | FICO 620 - 660 CLTV 95 - 100 | | FICO 600 - 620 CLTV 95 - 100 | |
| FICO 640 - 660 CLTV 90 - 95 | | FICO 600 - 640 CLTV 90 - 95 | | FICO 520 - 540 CLTV 85 - 90 | |
| FICO 580 - 620 CLTV 0 - 90 | | FICO 560 - 580 CLTV 85 - 90 | | FICO 0 - 600 CLTV 90 - 100 | |
| FICO 560 - 580 CLTV 0 - 85 | | FICO 540 - 560 CLTV 75 - 90 | | FICO 0 - 520 CLTV 75 - 100 | |
| FICO 540 - 560 CLTV 0 - 75 | | FICO 520 - 540 CLTV 65 - 85 | | FICO 0 - 460 CLTV 65 - 100 | |
| FICO 480 - 540 CLTV 0 - 65 | | FICO 460 - 520 CLTV 65 - 75 | | | |
| | | FICO 0 - 480 CLTV 0 - 65 | | | |

FIG. 6

| Green | Yellow | Red |
|---|---|---|
| FICO 620 - 1100 CLTV 0 - 90 | FICO 660 - 1100 CLTV 90 - 100 | FICO 580 - 600 CLTV 85 - 90 |
| FICO 600 - 620 CLTV 80 - 85 | FICO 600 - 620 CLTV 85 - 90 | FICO 0 - 660 CLTV 90 - 100 |
| FICO 560 - 580 CLTV 0 - 80 | FICO 580 - 600 CLTV 80 - 85 | FICO 0 - 580 CLTV 80 - 90 |
| FICO 540 - 560 CLTV 65 - 75 | FICO 500 - 560 CLTV 70 - 80 | FICO 0 - 500 CLTV 70 - 80 |
| FICO 520 - 560 CLTV 0 - 65 | FICO 520 - 540 CLTV 65 - 70 | FICO 0 - 460 CLTV 65 - 70 |
| FICO 460 - 520 CLTV 0 - 70 | FICO 0 - 460 CLTV 0 - 65 | |

FIG. 7

LOAN INFORMATION ANALYSIS SYSTEM AND METHOD

PRIORITY APPLICATION

This application claims priority to co-pending U.S. Provisional Application No. 61/143,290, filed Jan. 8, 2009, entitled "LOAN INFORMATION ANALYSIS SYSTEM AND METHOD", which is incorporated herein by this reference.

FIELD OF THE INVENTION

The present invention relates generally to the field of financial data management, and more particularly to methods and systems for loan information analysis.

BACKGROUND OF THE INVENTION

Currently, Wall Street is struggling to effectively analyze and comprehend the residential mortgage-backed security ("RMBS") asset class. Unfortunately, the traditional approaches for evaluating the credit characteristics and forecast the investment performance of RMBS have been inaccurate and unreliable. Accordingly, there is a present need for a method and system that addresses the problem of effective, reliable evaluation of RMBS.

SUMMARY OF THE INVENTION

It is a feature and advantage of the present invention to provide methods and systems for loan information analysis, for example, to analyze the credit quality of RMBS by integrating loan-level information along with sophisticated prepay, default, and loss models to value and evaluate residential mortgages.

To achieve the stated and other features, advantages and objectives, embodiments of the present invention utilize, for example, computer hardware, operating systems, programming languages, software applications, and other technology to provide methods and systems for evaluating RMBS. These technologies include, for example, receiving via a first computer software application program process tangibly embodied in a physical storage device executing on a physical computer hardware machine (a "computer program software application process"), electronic loan data for the same individual loan from two or more different loan information providers, and integrating, via a second computer program software application process, the electronic loan data for respective individual loans received from the loan information providers.

Thereafter, each individual loan in the resulting integrated loan data is scored with a risk score based on a plurality of risk attributes of each individual loan by a third computer program software application process, and the individual loans are bucketed into risk groups according to respective risk scores for each individual loan by a fourth computer program software application process. In addition, pre-defined forecast vectors are applied to the bucketed loans by a fourth computer program software application process to generate cash flow forecasts for the bucketed loans, and a price and/or yield for each bucketed loan is derived by a fifth computer program software application process based on the cash flow forecasts.

According to embodiments of the invention, the electronic loan data is received over a network from databases of two or more different loan information providers and consists of raw mortgage loan data comprising specific loan level attributes. The electronic loan data for embodiments of the invention is independently generated by the loan information providers by electronically scrubbing loan servicer tapes related to the same individual loans, and comprises, for example, loan identification, property location, occupancy type, original loan amount, original property appraisal, current loan balance, interest rate, and payment history. In further embodiments, the electronic loan data is integrated, for example, by combining the electronic loan data received from the different loan information providers by programmatically mapping corresponding datasets of the electronic loan data from the respective loan information providers together by master identifiers and generating a blended dataset of electronic loan data provided by the loan information providers.

In embodiments of the invention, each loan is risk scored according to pre-determined indicia corresponding to different risk levels based on a plurality of risk attributes. These risk attributes include, for example, loan-to-value ("LTV") ratio, Fair Isaac Corporation ("FICO") credit score, the presence or absence of loan documentation, occupancy type, and/or payment history and property value appreciation or depreciation relative to a geographic location of the property from an origination date to a current date. Additional embodiments involve, for example, calculating a current LTV ratio of each individual loan based upon information about the appreciation or depreciation in value of the loan over time and a current loan balance. According to further embodiments, the plurality of risk attributes further includes, for example, a FICO credit score adjusted according to payment history for each individual loan, which payment history comprises a number of missed nonconsecutive payments in an immediately preceding twelve-month period, any bankruptcy, and any foreclosure.

Bucketing the individual loans into risk groups for embodiments of the invention involves, for example, assigning each individual loan into one of a number of grid buckets according to risk score, and then classifying each individual loan into the appropriate bucket depending on whether it is a voluntary prepay loan, an involuntary default loan, or a defaulted loan. In embodiments of the invention, the voluntary prepay loan bucket comprises a bucket for current loans that are expected to prepay; the involuntary prepay loan bucket comprises current loans that are expected to default; and the defaulted loan bucket comprises loans that are 90 or more days in default, already in foreclosure, or have been purchased by a lender. Further embodiments involve, for example, applying the forecast vectors to non-performing ones of the individual loans, which forecast vectors relate, for example, to a liquidation model comprising a probability of default, a severity of default, and a time lag to foreclosure or liquidation.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIGS. 2 and 3 are tables which illustrate examples of types of loan data received from loan information providers for embodiments of the invention;

FIG. 4 is a table which illustrates examples of adjustments to loan information, as well as default probability estimates, amount of loss on default expressed in percentage of outstanding balance, and credit enhancement for embodiments of the invention;

FIG. 5 is a table that illustrates an example of buckets for voluntary prepay loans, involuntary default loans, and defaulted loans for embodiments of the invention;

FIG. 6 is a table that illustrates an example of FICO score and combined LTV ("CLTV") ranges for color scoring (green, yellow, and red) for current loans with full loan documentation for embodiments of the invention;

FIG. 7 is a table that illustrates examples of FICO score and CLTV ranges for color scoring for current loans with limited or no loan documentation for embodiments of the invention;

DETAILED DESCRIPTION

Figure 1:
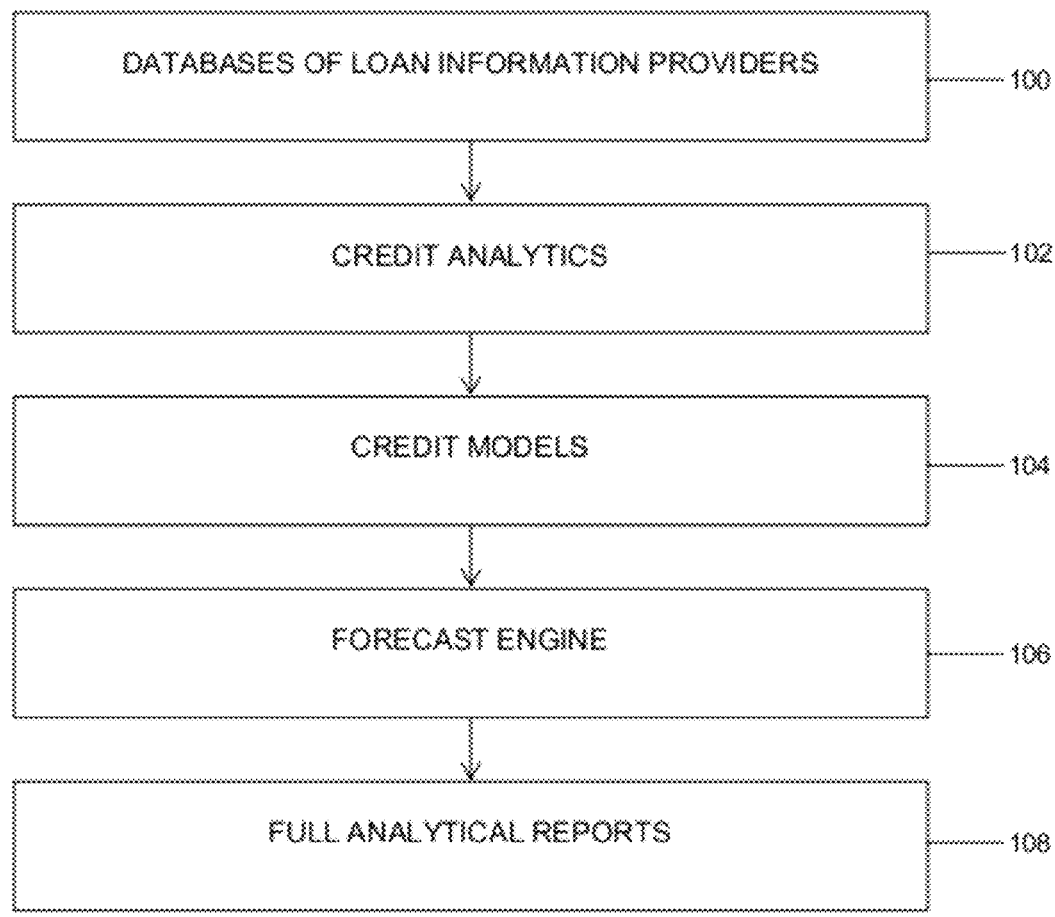
FIG. 1 is a schematic flow chart that illustrates an overview example of the process of loan information analysis for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Embodiments of the invention utilize one or more special purpose computer software application program processes, each of which is tangibly embodied in a physical storage device executable on one or more physical computer hardware machines, and each of which is executing on one or more of the physical computer hardware machines (each, a "computer program software application process"). Physical computer hardware machines employed in embodiments of the invention comprise, for example, input/output devices, motherboards, processors, logic circuits, memory, data storage, hard drives, network connections, monitors, and power supplies. Such physical computer hardware machines include, for example, user machines and server machines that may be coupled to one another via a network, such as a local area network, a wide area network, or a global network through telecommunications channels which may include wired or wireless devices and systems.

Embodiments of the invention provide a loan information analysis method and system that addresses the problem of evaluation of residential mortgage backed securities ("RMBS"), i.e., securities that are backed by whole residential mortgage loans. This analysis method and system for RMBS, also known as bonds, employs a proprietary approach for evaluating each individual loan within a given RMBS and assigning a type of risk score. Such embodiments employ a simple color code corresponding to different levels of risk of financial loss on a loan, such as red for loans having a higher risk level, yellow for loans having an intermediate risk level, and green for loans having a lower risk level. After risk scoring, the loans are bucketed into groups reflecting consideration of additional elements or risk and other factors. Thereafter, various forecasting factors are applied to the bucketed groups of assets, and projected cash flows are generated from which a forecast price and/or a yield is derived. Embodiments of the invention provide a unique way to address the different risk attributes commonly found in loans and to group loans with similar risk attributes together in order to evaluate and determine a fair price for such loans.

Significant features of embodiments of the invention include, for example, a distributed architecture, collateral grouping, pipeline liquidation models, historical reports, application of vectors at any granularity, and quick adjustments to changing market conditions. The distributed architecture for embodiments of the invention provides a load balancing mechanism that enables the running of a bond across multiple servers, thereby generating results more quickly. Collateral grouping for embodiments of the invention is a unique way of grouping sets of loans. The distributed architecture for embodiments of the invention relates, for example, to how analytics are generated by the system. Thus, the system servers for embodiments of the invention can be accessed by a user at a client terminal via a network, such as the Internet, or through any other point of access, and a user's request for analytics is broken up and processed over a bank of separate servers.

Embodiments of the invention utilize loan-level information and credit analysis based, for example, on credit models and/or user-defined analytics to generate full analytical reports. FIG. 1 is a schematic flow chart that illustrates an overview example of the process of loan information analysis for embodiments of the invention. Referring to FIG. 1, electronic loan data from databases 100 of multiple loan information providers is received and processed via credit analytics 102, credit models 104, and a forecast engine 106 and full analytical reports 108 are generated.

Significant aspects of embodiments of the invention include, for example collateral grouping using a blended dataset of electronic loan data provided by multiple loan information providers based on product type, pipeline (loans in default 90 days or more), use of colors for original or current risk levels, and second lien status; pipeline liquidation model per asset liquidation logic; loan history reports; prepayment and default vectors applied at any granularity; and quick adjustments to changing market conditions (latent loss and loan modifications). In the distributed architecture aspect for embodiments of the invention, scenarios are broken up and processed simultaneously on separate servers.

Data input for embodiments of the invention includes raw mortgage loan data from a number of different sources. For example, providers of data, such as INTEX CORPORATION™ and LOAN PERFORMANCE™, provide raw, whole loan data. Such data includes specific loan level attributes, such as loan balance, loan type, amortization type, coupons, occupancy type (i.e., owner occupied or investor owned). Such data providers acquire the specific information about loans by scrubbing loan servicing system tapes, commonly referred to as servicer tapes. For example, loan-level data is made available to such data providers electronically from loan servicers, such as COUNTRYWIDE™ (currently owned by BANK OF AMERICA™). While the loan data is acquired by such data providers from the same sources, the types of information may vary, and their scrubbing techniques can and do vary.

For example, the scrubbing techniques employed by one data provider may yield better specific loan information in certain areas than those employed by another data provider. Consequently, even though different data providers glean specific loan information from the same raw data, they do not necessarily achieve exactly the same results. Thus, integrating the loan data from multiple data providers produces a much more comprehensive picture of what a particular loan looks like. The loan-level data is received electronically from two or more loan-level information providers and reconciled and cleaned using, for example, computer program software application processes.

Embodiments of the invention employ database hardware and software including, for example, database loaders and application programming interfaces ("APIs"), and utilize electronic data from data providers including, for example, prime, Alt-A (e.g., less than prime but greater than subprime quality), and subprime loan data, Federal Home Loan Mortgage Corporation (FHLMC), Federal National Mortgage Association (FNMA), and Government National Mortgage Association (GNMA) pool data, agency and non-agency structured product data, and collateralized debt obligation (CDO) data. The loan data include, for example, deal level data, loan master data, and dynamic loan data, as well nonagency data including, for example, static loan attribute records, loan history records, and loan delinquency records. FIGS. 2 and 3 are tables which illustrate examples of types of loan data received from loan information providers for embodiments of the invention. Referring to FIG. 2, such loan data includes detailed loan information, such as loan ID 200, property location ZIP code 202, occupancy type 204, original loan amount 206 and property appraisal 208, and to FIG. 3, current loan balance 300, interest rate 302, delinquency history 304, and foreclosure start 306 and finish 308 dates.

The same sorts of data are acquired from two or more data providers, and the respective data sets are integrated for embodiments of the invention. Thus, instead of a single data provider's perspective, embodiments of the invention provide a commonly occurring situation in which one of the data providers does not have certain loan attributes for a particular loan—such as occupancy or a FICO credit score of the borrower—the other data provider usually has those attributes for the particular loan. Thus, integrating the loan data from multiple data providers avoids missing certain key risk indicators which might be overlooked from the perspective of a single data provider.

Computer program software application processes for embodiments of the invention are utilized to blend together the electronic loan information datasets received from loan information providers. For example, embodiments of the invention provide a computer application process that ties the data providers' bond names together and combines datasets from multiple different data providers by programmatically mapping the data sets together by master identifiers. The result is a blend of datasets from different data providers.

Risk coding of a particular mortgage with a type of risk score for embodiments of the invention is based, for example, on multiple individual risk attributes of the particular mortgage. A focus on a single risk attribute of the particular mortgage would not provide a basis for accurately assessing the true risks of that individual loan. Accordingly, embodiments of the invention involve adjusting a loan's risk score based, for example, on the history of the payments, as well as key fundamental characteristics, such as FICO score, the presence or absence of documentation on the loan, the occupancy type (e.g., single family dwelling, multi-family dwelling, or condominium type dwelling), loan-to-value ("LTV") ratio, and property value appreciation or depreciation.

Assume, for example, that a particular loan was originated in 2003. Embodiments of the invention employ another set of data that indicates how that individual loan has appreciated relative to its geographic area from its origination in 2003 to a current date. That information is important with respect to one of the key indicators, i.e., the LTV ratio. Armed with information about the appreciation in value of the particular loan over time and the current loan balance, the current LTV ratio can be recalculated on the fly based upon how the value of the mortgaged property has appreciated or depreciated relative to the current mortgage loan balance. Inasmuch as LTV ratio is a key risk indicator, information about the appreciation or depreciation of the value of the mortgaged property is considered to be critical.

Embodiments of the invention utilize, for example, the four indicators—LTV ratio, FICO credit score, loan documentation, and occupancy type—to provide a grid view of risk for a universe of loans based upon those four attributes. According to embodiments of the invention, for example, the performance histories for loans that fall into each one of three "grid buckets" are considered, and the population of loans segmented using the bucket methodology. It is thus possible to determine how those buckets have been performing and to see that certain types of loans are going to take greater losses than other types of loans. Embodiments of the invention include mechanics of breaking up the non-performing bucket and involve the development of forward looking performance forecasting vectors based upon historical data, which forecasting vectors can be applied to loan risk buckets.

As previously described herein, the blending of two or more mortgage loan datasets yields information, such as second lien status, that a single dataset may not have and which is very important information to have when determining a risk score on a mortgage loan. Such information about whether a mortgage loan is a second lien or a first lien is not currently readily available in the industry, and blending two or more mortgage loan datasets according to embodiments of the invention provides that information quickly.

Assume, for example, that a financial institution, such as a bank, which is the owner of a number of mortgage loans, wishes to remove those loans from its balance sheet by securitizing the loans into a bond and selling the bond. In securitizing the loans, the financial institution may elect to structure the resulting securities so as be collateralized by only first-lien loans, or by only second-lien loans, or by a combination of the two loan types. Critical second lien information is uncovered according to embodiments of the invention, for example, by blending the servicing tape information provided by a particular loan data provider that may lack information about such second lien status with the servicing tape information provided by another loan data provider which includes such information.

It is the general experience of RMBS market participants that second-lien mortgage loans default with a much shorter lag and higher severity than first-lien mortgage loans. "Severity" is an industry term that represents the percentage of losses net of advances that occurs when a loan liquidates, and "lag" represents the period of time between the date on which a borrower stops making payments on a loan and the date on which the loan is liquidated. A bond may be comprised of first and second lien loans, and embodiments of the invention involve breaking the bond into buckets by lien type, and simulating an aggressive defaulting of all second-lien loans at high severities and running all first-lien loans at less aggressive loss scenarios. Thus, the second-lien loans in the bond may fall into a bucket associated with the greatest risk, while the first-lien loans in the bond may fall into a bucket associated with less risk.

Embodiments of the invention leverage the blended datasets so that individual groups of loans can be bucketed with greater detail and more accurately reflect the type of risk that is associated with each bucket. Product type relates to mortgage loan amortization type, such as adjustable rate mortgages ("ARMs"), 30-year fixed interest rate mortgages, 15-year fixed interest rate mortgages, and 5-year hybrid loan mortgages. "Pipelines" are mortgage loans that are in default and have not been paid in 90 days (i.e., 90 day+ delinquent loans). Embodiments of the invention involve, for example, breaking the Pipeline "90+" loans into their own bucket, and thereafter forecasting how that bucket will act over a pre-determined period of time, such as the next 360 months.

Such forecasts are based, for example, on a substantial amount of historical research and prior experience with Pipeline loans to determine, on a geographic basis, the probability of default, the average severity of loss, and the average amount of time lag to foreclosure and/or liquidation on particular loans. Based on such forecasts, the Pipeline liquidation model for embodiments of the invention determines how to liquidate or amortize 90+ assets on a loan-by-loan basis. For example, the pipeline liquidation model may forecast that a particular loan will default in six months and will liquidate 15 months later.

Figure 4:
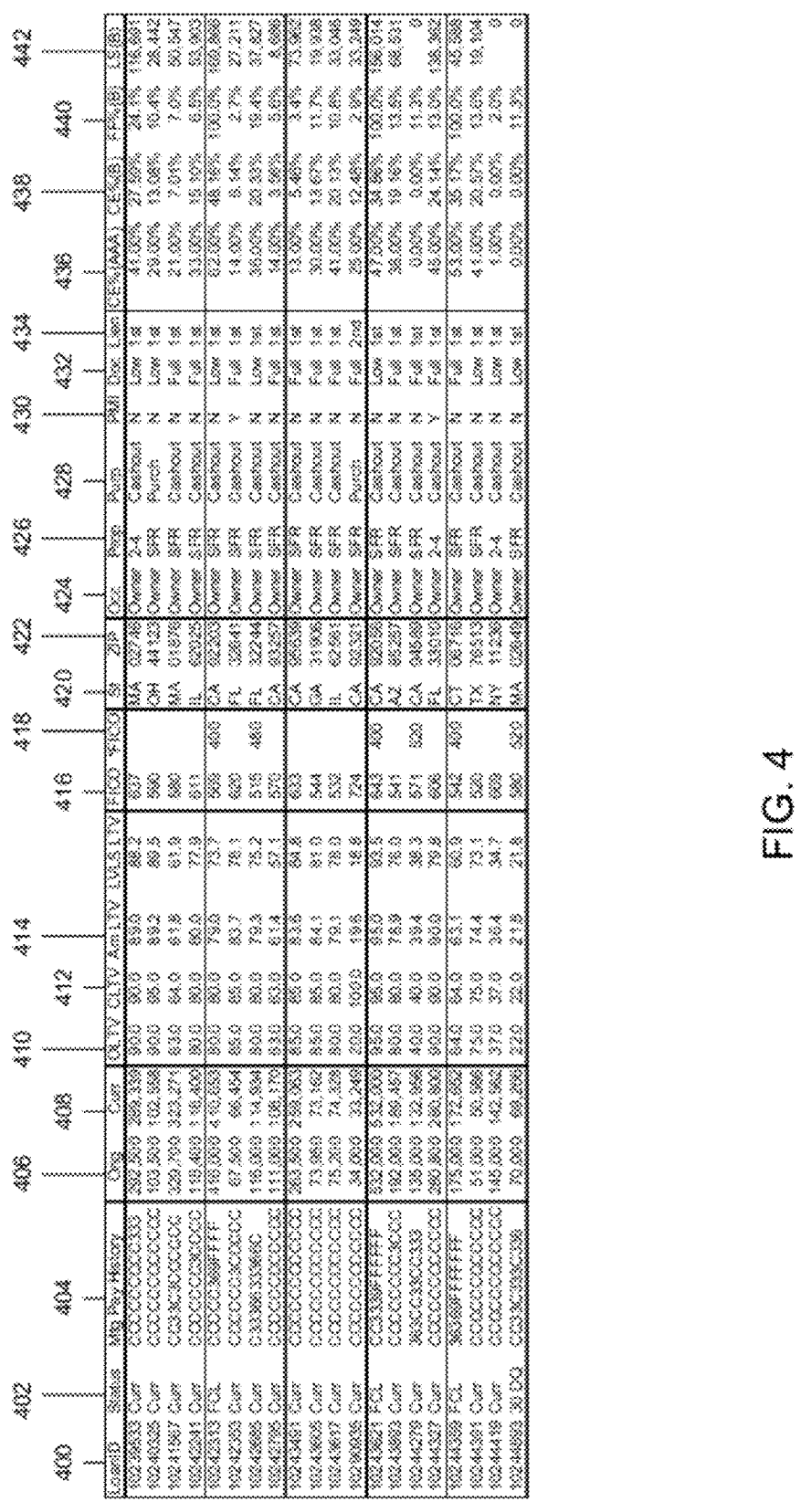

Other computer program software application processes are used, for example, to adjust FICO scores based on mortgage payment history and to adjust LTV ratios for home price appreciation ("HPA"), which drives defaults and loss severities. In addition, private mortgage insurance ("PMI") can be added or removed as an evaluation factor using still other computer program software application processes. FIG. 4 is a table which illustrates examples of adjustments to loan information, as well default probability estimates, amount of loss on default expressed in percentage of outstanding balance, and credit enhancement. FIG. 4 includes columns, for example, for loan ID 400, status 402, payment history 404, original 406 and current 408 loan balance, original 410, combined 412, and amortized 414 LTV ratio, FICO score 416 and adjusted FICO score 418, state 420 and ZIP code 422, occupancy 424 and property 426 type, loan purpose 428 and PMI 430, loan documentation 432 and lien status 434, credit enhancement CE (AAA) 436 and CE (B) 438, default probability FF 440, and estimated loss on default LS 442.

Collateral bucketing for embodiments of the invention involves, for example, use of additional computer program software application processes to segregate loans into buckets, such as a bucket for voluntary prepay loans, a bucket for involuntary default loans, and a bucket for defaulted loans. Prepayment occurs when a loan is paid in full before maturity or default. Thus, a loan may be prepaid during its normal course, for example, when the loan is re-financed or when the mortgagor dies or sells the mortgaged property. The voluntary prepay loan bucket includes, for example, current loans that are expected to prepay; the involuntary prepay loan bucket includes, for example, current loans that are expected to default; and the defaulted loan bucket includes, for example, loans that are 90 or more days in default, already in foreclosure, or have been purchased by the lender (REO). Still additional computer program software application processes can be used to further segregate the loans, for example, by loan type. FIG. 5 is a table that illustrates an example of buckets for voluntary prepay loans 500, involuntary default loans 502, and defaulted loans 504 for embodiments of the invention.

The collateral grouping aspect for embodiments of the invention focuses, for example, on product type and details of product type, such as thirty (30) year ARMs with fixed interest rates for the initial two, three or five years; Pipeline loans in default 90 or more days; use of color representations for loans at origination and with current scoring; lien status; loan modifications; and latent loss loans. The flexible architecture developed for embodiments of the invention allows easy changes to grouping requirements.

The Pipeline model for embodiments of the invention is based on a severity and lag grid created by bucketing first lien loans by metropolitan statistical area (MSA) and loan balance. Pipeline loans are matched to the grid for severity and lag, second-lien Pipeline loans are assigned static severities, and Pipeline loans with stale last interest paid dates are liquidated immediately with variable breadth derived from delinquency status.

Current color scoring for embodiments of the invention utilizes the combined loan-to-value ("CLTV") ratio (i.e., the LTV when there is more than one loan on the property). If the mortgaged property is not owner-occupied, then a pre-determined percentage, such as ten percent, is added to the CLTV. If property type is equal to two-to-four units or manufactured housing, then a pre-determined percentage, such as ten percent, is likewise added to the CLTV. FICO scores are adjusted depending, for example, on how many times the borrower missed nonconsecutive payments in the immediately preceding twelve months. For example:

2×30 Days=580
3×30 Days=560
4×30 Days=520
5×30 Days=480
1×60 Days=520
2×60 Days=480
1×90 Days=480
Bankruptcy or Foreclosure=400

Color scoring at origination does not adjust CLTV ratios or FICO scores.

FIG. 6 is a table that illustrates an example of FICO score and CLTV ranges for color scoring (e.g., green 600, yellow 602, and red 604) for current colors with full loan documentation, and FIG. 7 is a table that illustrates examples of FICO score and CLTV ranges for color scoring for current colors with limited or no loan documentation, for embodiments of the invention.

Historical reports for embodiments of the invention are compiled according to pre-defined algorithms based on historic data and illustrate different performance reports for groups of loans or individual loans. Applying vectors at any granularity for embodiments of the invention involves, for example, developing forward looking forecast vectors, such as prepayment and default vectors, based upon historical research on loans.

Quick adjustments to changing market conditions for embodiments of the invention involve modeling based on observations in the market. For example, there is currently considerable discussion and activity regarding loan modifications. Embodiments of the invention involve development of a loan modification model that enables a forecast of what is likely to occur over a succeeding period of time, such as two, three, or four years, in connection with a study of defaulting loans. For example, the loan modification model for embodiments of the invention can predict that in the event a given number of loans default, a certain number of those loans are going to be modified, for example, between the servicer dealing directly with the borrower and negotiating a new balance and/or rate, and forecast that during the modification process, certain events will occur on a forward-looking basis up to at least 360 months.

The Pipeline model for embodiments of the invention utilizes, for example, geographic research to determine severity and lag for liquidation. According to embodiments of the invention, second-lien Pipeline loans are assigned a "static" severity because research indicates that virtually all second-lien loans default with a severity of 105%. Embodiments of the invention involve, for example, "shocking" or downgrading the FICO score based upon payment history.

The results generated according to embodiments of the invention can be utilized, for example, by trading desks to evaluate RMBS and/or to mark to market a portfolio of such products. An "in-the-pipeline" model for embodiments of the invention relates to loans that are already in the default process (i.e., assumed will not prepay) and involves use of models for liquidation lag and loss severity or user inputs for loss severities and distribution of recoveries and losses.

Figure 8:
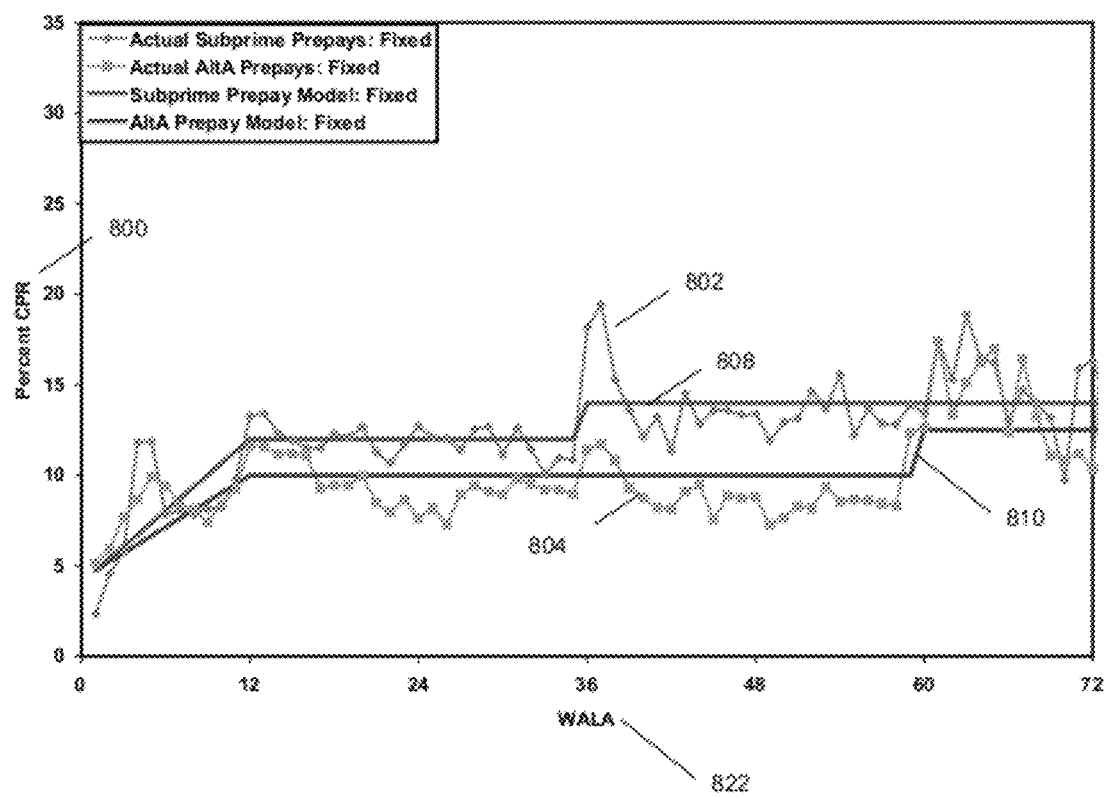
FIG. 8 is a graph that illustrates an example of the relationship between percent constant prepayment rate vs. weighted average loan age for actual subprime prepays (fixed), actual AltA prepays (fixed), subprime prepay model (fixed), and AltA prepay model (fixed) for embodiments of the invention.

A voluntary prepay model for embodiments of the invention relates to loans that are projected to prepay in full and involves use of prepay timing models according to product type, such as ARMs with fixed interest rates for two or three years and adjustable for 28 or 27 years respectively, fixed interest rates, etc. FIG. 8 is a graph that illustrates an example of the relationship between percent constant prepayment rate 800 vs. weighted average loan age 802 for actual subprime prepays (fixed interest rate) 804, actual AltA prepays (fixed interest rate) 806, subprime prepay model (fixed interest rate) 808, and AltA prepay model (fixed interest rate) 810 for embodiments of the invention.

Figure 9:
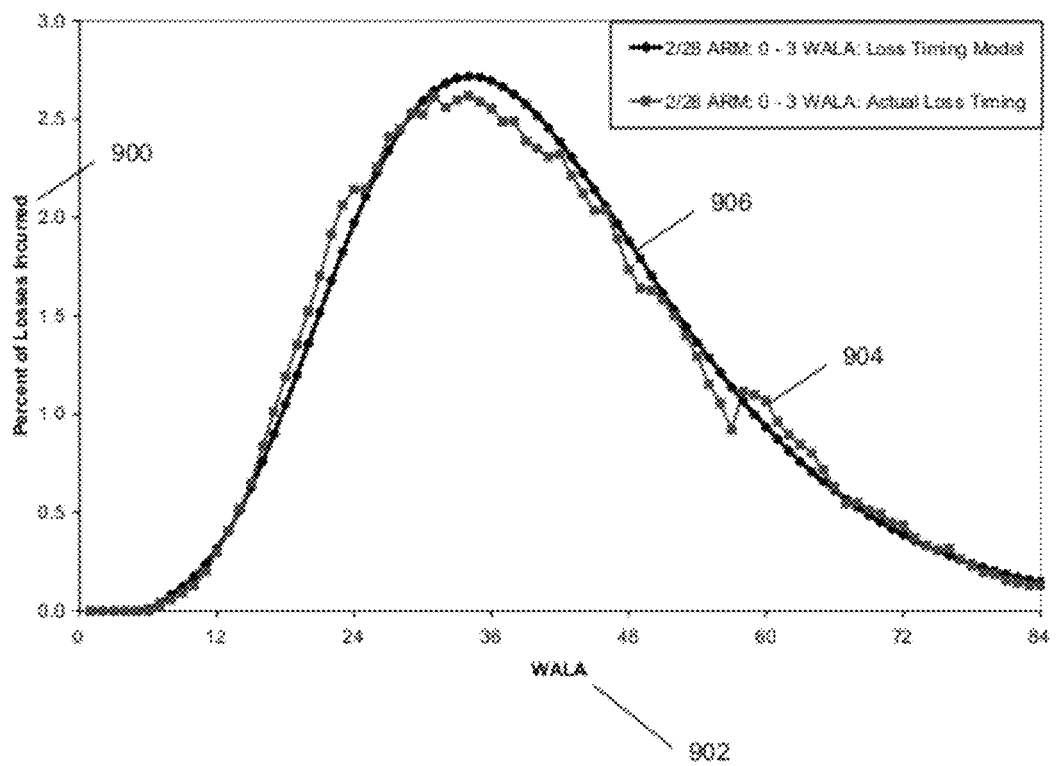
FIG. 9 is a graph that illustrates an example of the relationship between various percent of losses incurred and weighted average loan age for actual 2/28 ARMs and model 2/28 ARMs for embodiments of the invention.

An involuntary model for embodiments of the invention relates to loans that are current today, but projected to default and involves use of loss timing models (faster or slower loss timing) according to product type, such as ARMs with fixed interest rates for two or three years and adjustable for 28 or 27 years respectively, fixed interest rates, etc. FIG. 9 is a graph that illustrates an example of the relationship between percent of losses incurred 900 vs. weighted average loan age 902 for actual 2/28 ARMs 904 and model 2/28 ARMs 906 for embodiments of the invention.

Figure 10:
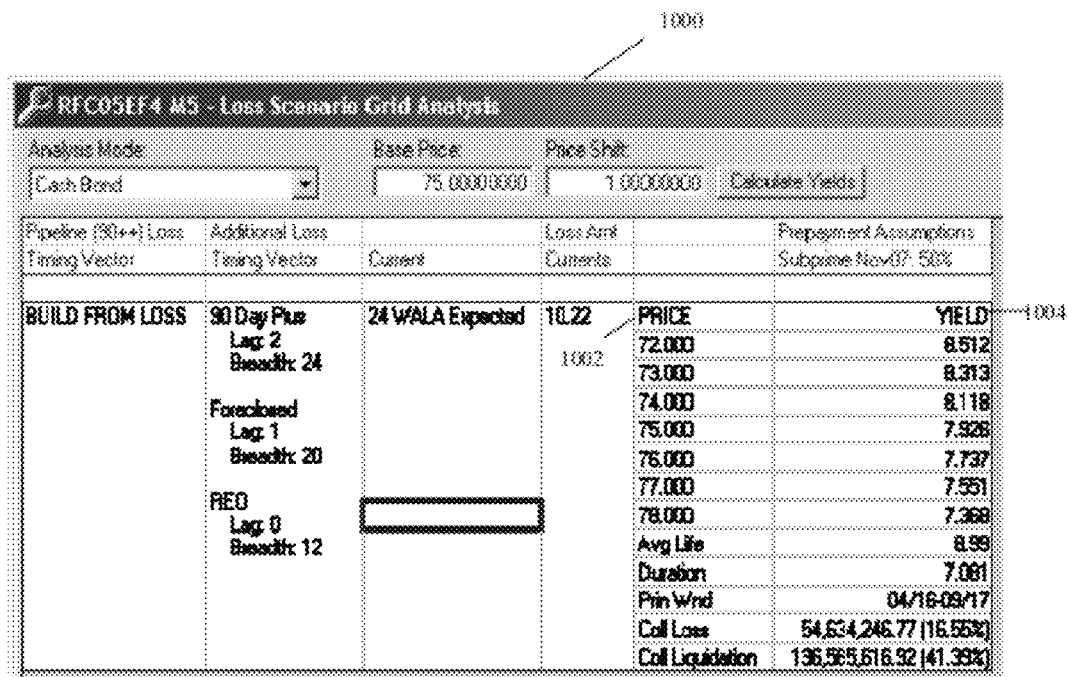
FIG. 10 is a graphical user interface ("GUI") display that illustrates an example of a loss scenario grid analysis screen with price and yield figures for embodiments of the invention.

Embodiments of the invention involve an engine for generating price/yield through which all cash flows are run to develop tranche level analytics. Tranche level cash flows are used to analyze a Pay-As-You-Go Credit Default Swap on an RMBS (i.e., a credit derivative transaction based on a specific RMBS). FIG. 10 is a GUI display that illustrates an example of a loss scenario grid analysis screen 1000 with price 1002 and yield figures 1004 for embodiments of the invention.

Figure 11:
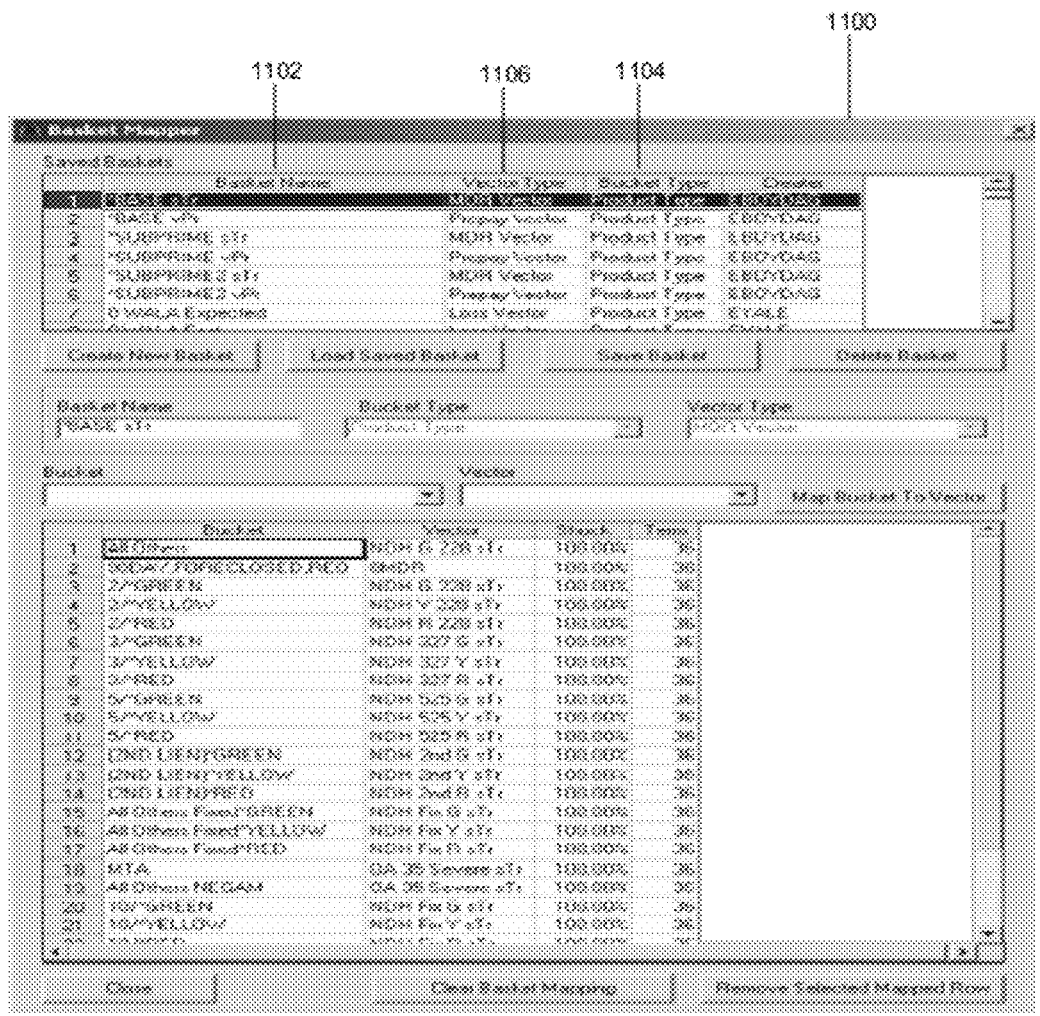
FIG. 11 is a GUI display that illustrates an example of a basket mapper screen with basket name and bucket and vector types for embodiments of the invention.

The vectors aspect for embodiments of the invention involves, for example, creation of a basket model that enables the assignment of custom vectors, such as prepay vectors, mortgage default rate vectors, and loss vectors, to any collateral grouping. FIG. 11 is a GUI display that illustrates an example of a basket mapper screen 1100 with basket name 1102 and bucket 1104 and vector types 1106 for embodiments of the invention.

Figure 12:
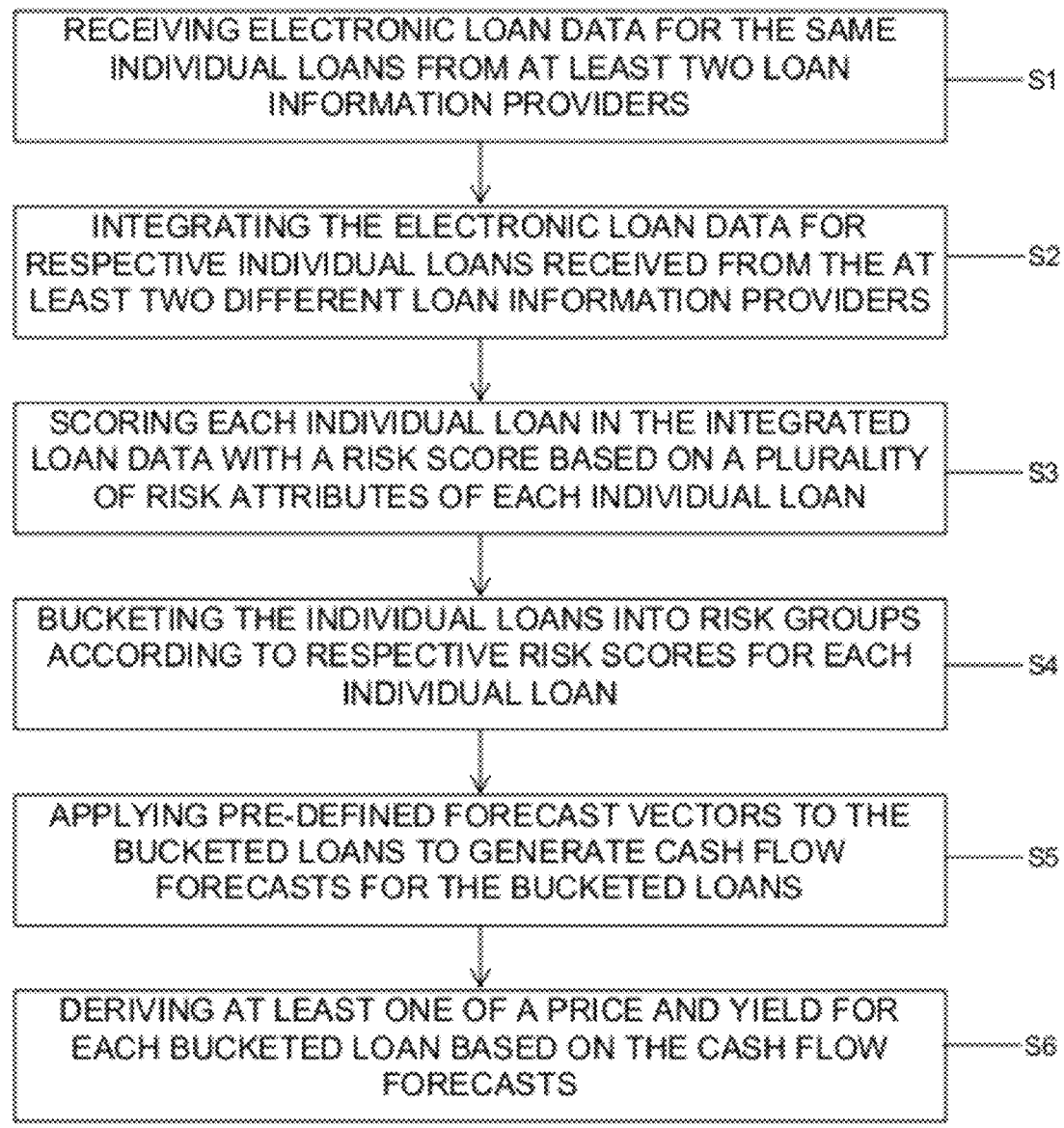
FIG. 12 is a flow chart that illustrates an overview example of the process of evaluating RMBS for embodiments of the invention.

FIG. 12 is a flow chart that illustrates an overview example of the process of evaluating residential mortgage loan backed security products for embodiments of the invention. Referring to FIG. 12, at 51, electronic loan data for the same individual loans is received from two or more loan information providers via a first computer program software application process and is integrated by a second computer program software application process at S2. At S3, each individual loan in the integrated loan data is scored with a risk score based on a plurality of risk attributes of each individual loan by a third computer program software application process.

Referring further to FIG. 12, at S4, the individual loans are bucketed into risk groups according to respective risk scores for each individual loan by a fourth computer program software application process, and at S5, pre-defined forecast vectors are applied to the bucketed loans to generate cash flow forecasts for the bucketed loans by a fourth computer program software application process. At S6, a price and/or yield are/is derived for each bucketed loan based on the cash flow forecasts by a fifth computer program software application process.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method of evaluating the credit characteristics, investment performance, and current market value of residential mortgage loan backed securities products ("RMBS"), comprising:
   receiving via a first computer software application process tangibly embodied in a physical storage device executing on a physical computer hardware machine electronic loan data for the same existing individual loans from at least two different loan information providers;
   integrating by a second computer program software application process the electronic loan data for respective existing individual loans received from the at least two different loan information providers;
   scoring by a third computer program software application process each existing individual loan in the integrated loan data with a risk score based on a plurality of risk attributes of each existing individual loan, said plurality of risk attributes consisting at least in part of loan-to-value ("LTV") ratio, credit score, a presence or absence of loan documentation, and occupancy type of each existing individual loan;
   bucketing by a fourth computer program software application process the existing individual loans into risk groups according to respective risk scores for each existing individual loan;
   applying by a fourth computer program software application process pre-defined forecast vectors to the bucketed loans to generate cash flow forecasts for the bucketed loans; and
   deriving, by a fifth computer program software application process, at least one estimate of a price and yield for each bucketed loan based on the cash flow forecasts.

2. The method of claim 1, wherein receiving the electronic loan data further comprises receiving the electronic loan data over a network from databases of the at least two different loan information providers.

3. The method of claim 1, wherein receiving the electronic loan data further comprises receiving raw mortgage loan data comprising specific loan level attributes.

4. The method of claim 1, wherein receiving the electronic loan data further comprises independently generating the electronic loan data by the at least two different loan information providers by electronically scrubbing loan servicer tapes related to the same existing individual loans.

5. The method of claim 1, wherein the electronic loan data comprises loan identification, property location, occupancy type, original loan amount, original property appraisal, current loan balance, interest rate, and payment history.

6. The method of claim 1, wherein integrating the electronic loan data further comprises combining the electronic loan data received from the at least two different loan information providers by programmatically mapping corresponding datasets of the electronic loan data from the respective loan information providers together by master identifiers.

7. The method of claim 6, wherein integrating the electronic loan data further comprises generating a blended dataset of electronic loan data provided by the at least two different loan information providers.

8. The method of claim 1, wherein scoring each existing individual loan further comprises risk scoring each loan according to pre-determined indicia corresponding to different risk levels.

9. The method of claim 1, wherein credit score further comprises Fair Isaac Corporation ("FICO") credit score.

10. The method of claim 9, wherein the plurality of risk attributes further comprises payment history and property value appreciation or depreciation relative to a geographic area of the property from an origination date for each existing individual loan to a current date.

11. The method of claim 10, further comprising calculating a current LTV ratio of each existing individual loan based upon information about the appreciation or depreciation in value of the loan over time and a current loan balance.

12. The method of claim 9, wherein the plurality of risk attributes further comprises a FICO credit score adjusted according to payment history for each existing individual loan.

13. The method of claim 12, wherein payment history for each existing individual loan comprises a number of missed nonconsecutive payments in an immediately preceding twelve-month period, any bankruptcy, and any foreclosure.

14. The method of claim 1, wherein bucketing the existing individual loans into risk groups further comprises bucketing each existing individual loan into one of a plurality of grid buckets according to risk score.

15. The method of claim 14, wherein bucketing the existing individual loans into risk groups further comprises bucketing each existing individual loan into one of a bucket for voluntary prepay loans, a bucket for involuntary default loans, and a bucket for defaulted loans.

16. The method of claim 15, wherein the voluntary prepay loan bucket comprises a bucket for current loans that are expected to prepay, the involuntary prepay loan bucket comprises current loans that are expected to default, and the defaulted loan bucket comprises loans that are 90 or more days in default, already in foreclosure, or have been purchased by a lender.

17. The method of claim 1, wherein applying the forecast vectors further comprises applying the forecast vectors to non-performing ones of existing individual loans.

18. The method of claim 17, wherein the forecast vectors further comprise a liquidation model comprising a probability of default, a severity of default, and a time lag to foreclosure or liquidation.

19. A machine for evaluating residential mortgage loan backed securities products ("RMBS"), comprising:
a microprocessor coupled to a memory, wherein the microprocessor is programmed to evaluate RMBS by:
receiving electronic loan data for the same existing individual loans from at least two different loan information providers;
integrating the electronic loan data for said same existing individual loans received from said at least two different loan information providers;
scoring each existing individual loan in the integrated loan data with a risk score based on a plurality of risk attributes of each existing individual loan, said plurality of risk attributes consisting at least in part of loan-to-value ("LTV") ratio, credit score, a presence or absence of loan documentation, and occupancy type of each individual loan;
bucketing the existing individual loans into risk groups according to respective risk scores;
applying pre-defined forecast vectors to the bucketed loans to generate cash flow forecasts for the bucketed loans; and
deriving at least one estimate of a price and yield for each bucketed loan based on the cash flow forecast.

20. A non-transitory computer-readable storage medium with an executable program for evaluating residential mortgage loan backed securities products ("RMBS") stored thereon, wherein the program instructs a microprocessor to perform the following steps:
receiving electronic loan data for the same existing individual loans from at least two different loan information providers;
integrating the electronic loan data for said same existing individual loans received from said at least two different loan information providers;
scoring each existing individual loan in the integrated loan data with a risk score based on a plurality of risk attributes of each existing individual loan, said plurality of risk attributes consisting at least in part of loan-to-value ("LTV") ratio, credit score, a presence or absence of loan documentation, and occupancy type of each existing individual loan;
bucketing the loans into risk groups according to respective risk scores;
applying pre-defined forecast vectors to the bucketed loans to generate cash flow forecasts for the bucketed loans; and
deriving at least one estimate of a price and yield for each bucketed loan based on the cash flow forecast.

* * * * *